United States Patent
Lee et al.

(10) Patent No.: US 10,634,595 B2
(45) Date of Patent: Apr. 28, 2020

(54) METHOD OF MEASURING FRACTURE STRENGTH OF SINGLE PARTICLES OF SUPERABSORBENT POLYMER

(71) Applicant: LG Chem, Ltd., Seoul (KR)

(72) Inventors: Daewoong Lee, Daejeon (KR); Sung Hyun Park, Daejeon (KR); Myung Han Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/749,943

(22) PCT Filed: Sep. 7, 2016

(86) PCT No.: PCT/KR2016/010025
§ 371 (c)(1),
(2) Date: Feb. 2, 2018

(87) PCT Pub. No.: WO2017/061705
PCT Pub. Date: Apr. 13, 2017

(65) Prior Publication Data
US 2018/0231443 A1 Aug. 16, 2018

(30) Foreign Application Priority Data
Oct. 7, 2015 (KR) .................. 10-2015-0140934

(51) Int. Cl.
*G01N 3/08* (2006.01)
*G01N 15/10* (2006.01)
(52) U.S. Cl.
CPC ............... *G01N 3/08* (2013.01); *G01N 15/10* (2013.01); *G01N 2203/0067* (2013.01); *G01N 2203/0286* (2013.01)

(58) Field of Classification Search
CPC .. G01N 3/08; G01N 15/10; G01N 2203/0067; G01N 2203/0286
(Continued)

(56) References Cited

U.S. PATENT DOCUMENTS 4,446,261 A   5/1984   Yamasaki et al.
4,689,163 A * 8/1987   Yamashita ............... C08K 3/10
                                                    252/62.54
(Continued)

FOREIGN PATENT DOCUMENTS

CN    002824013 Y    10/2006
CN    201327461 Y    10/2009
(Continued)

OTHER PUBLICATIONS

Antonyuk S et al., "Breakage behaviour of spherical granulates by compression", Chemical Engineering Science, Jul. 1, 2005, vol. 60, No. 14, pp. 4031-4044, Oxford, GB, XP027646343.
(Continued)

*Primary Examiner* — Octavia Hollington
(74) *Attorney, Agent, or Firm* — Lerner, David, Littenberg, Krumholz & Mentlik, LLP

(57) ABSTRACT

A method of measuring fracture strength of a superabsorbent polymer in order to predict a generation amount of fine powder is provided. Effects of many different treatments for increasing strength of the superabsorbent polymer may be evaluated by measuring a force at a time point when single particles having a uniform particle size of the superabsorbent polymer are fractured by pressurizing the particles at a constant rate within a predetermined range.

6 Claims, 3 Drawing Sheets

(58) Field of Classification Search
USPC ............................................................ 73/821
See application file for complete search history.

(56) References Cited

U.S. PATENT DOCUMENTS

| | | | | |
|---|---|---|---|---|
| 5,462,972 | A * | 10/1995 | Smith | A61F 13/15203 521/149 |
| 6,023,962 | A * | 2/2000 | Wang | G01N 11/08 73/54.09 |
| 6,331,315 | B1 * | 12/2001 | Salles | A61K 9/127 424/450 |
| 6,353,148 | B1 | 3/2002 | Gross | |
| 6,420,627 | B1 * | 7/2002 | Ohnishi | A61F 13/15203 139/383 R |
| 7,275,446 | B2 | 10/2007 | Benea et al. | |
| 7,473,470 | B2 * | 1/2009 | Ishizaki | C08J 3/12 428/292.1 |
| 8,809,227 | B1 * | 8/2014 | Rainer | B01J 20/267 502/400 |
| 9,624,328 | B2 * | 4/2017 | Won | C08J 3/075 |
| 9,701,796 | B2 * | 7/2017 | Jung | A61L 15/60 |
| 9,849,439 | B2 * | 12/2017 | Lee | C08F 20/10 |
| 10,086,362 | B2 * | 10/2018 | Kim | C08F 2/10 |
| 2004/0039360 | A1 | 2/2004 | Ehmsperger et al. | |
| 2005/0181200 | A1 * | 8/2005 | Mertens | C08J 3/12 428/327 |
| 2008/0227944 | A1 * | 9/2008 | Ambrosio | C08B 11/20 527/312 |
| 2010/0227098 | A1 | 9/2010 | Fukushi et al. | |
| 2011/0203355 | A1 | 8/2011 | Lindner et al. | |
| 2013/0299739 | A1 | 11/2013 | Grill et al. | |
| 2015/0259522 | A1 | 9/2015 | Lee et al. | |
| 2018/0304232 | A1 * | 10/2018 | Nam | C08F 20/06 |

FOREIGN PATENT DOCUMENTS

| | | |
|---|---|---|
| CN | 101344469 B | 12/2010 |
| CN | 202330162 U | 7/2012 |
| CN | 104244996 A | 12/2014 |
| EP | 0644224 A1 | 3/1995 |
| JP | S56161408 A | 12/1981 |
| JP | S57125340 A | 8/1982 |
| JP | S57158209 A | 9/1982 |
| JP | S57198714 A | 12/1982 |
| JP | S60186506 A | 9/1985 |
| JP | S6399861 A | 5/1988 |
| JP | H03226645 A | 10/1991 |
| JP | H04089549 A | 3/1992 |
| JP | H0790108 A | 4/1995 |
| JP | 2774353 B2 | 7/1998 |
| JP | H11241981 A | 9/1999 |
| JP | 2001242053 A | 9/2001 |
| JP | 2002517561 A | 6/2002 |
| JP | 4209390 B2 | 1/2009 |
| JP | 2014070961 A | 4/2014 |
| JP | 5783864 B2 | 9/2015 |
| KR | 100307409 B1 | 9/2001 |
| KR | 20050022813 A | 3/2005 |
| KR | 20080094722 A | 10/2008 |
| KR | 20120047035 A | 5/2012 |
| KR | 20140063457 A | 5/2014 |
| KR | 20150061270 A | 6/2015 |
| KR | 20150062959 A | 6/2015 |

OTHER PUBLICATIONS

Extended European Search Report including Written Opinion for Application No. EP16853821.3 dated Jun. 20, 2018.
International Search Report for Application No. PCT/KR2016/010025, dated Jan. 6, 2017.
Chinese Search Report for Chinese Application No. 201680045989.5 dated Jul. 11, 2019.

* cited by examiner

[FIG. 1]
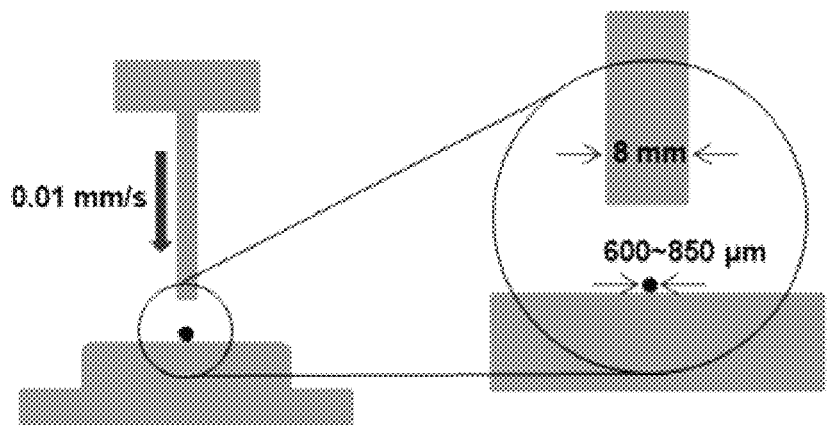
[FIG. 2]
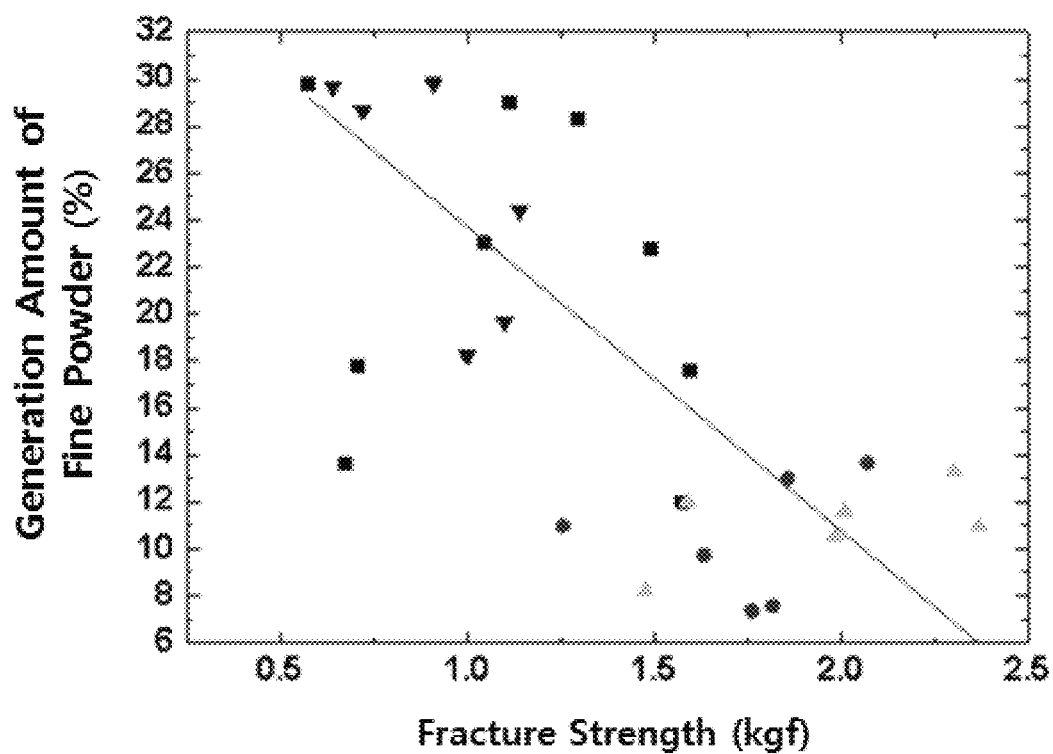

[FIG.3]
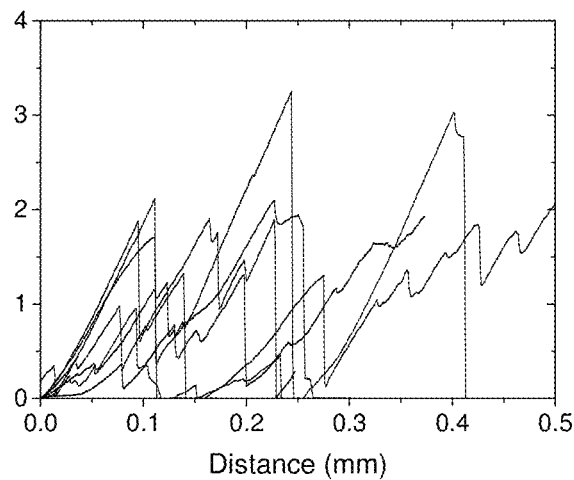
[FIG. 4]
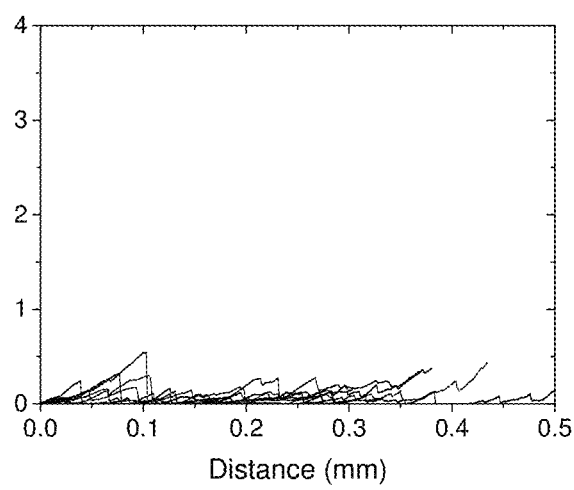

[FIG. 5]
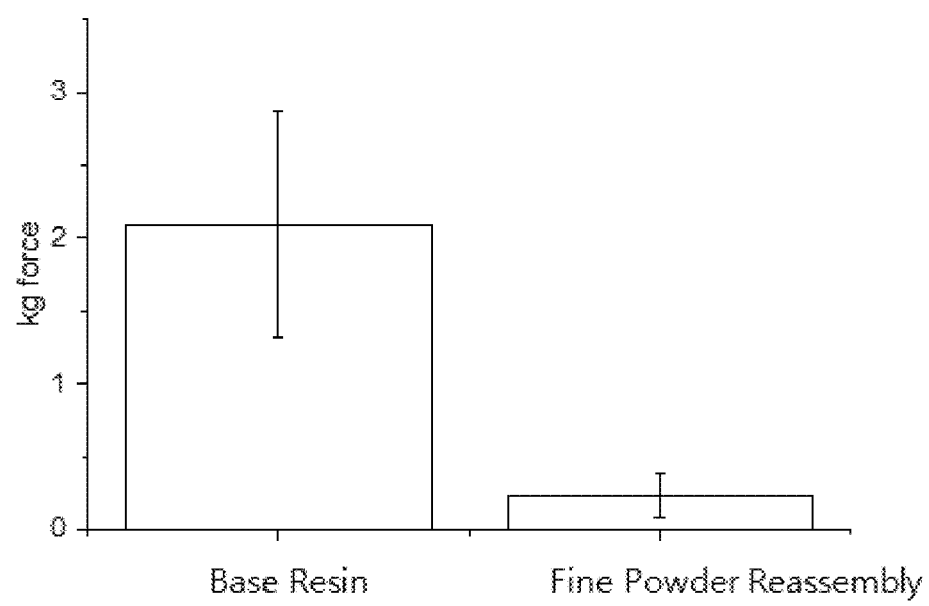

METHOD OF MEASURING FRACTURE STRENGTH OF SINGLE PARTICLES OF SUPERABSORBENT POLYMER

CROSS-REFERENCE TO RELATED APPLICATIONS

The present application is a national phase entry under 35 U.S.C. § 371 of International Application No. PCT/KR2016/010025 filed Sep. 7, 2016, which claims priority from Korean Patent Application No. 10-2015-0140934 filed Oct. 7, 2015, both of which are incorporated herein by reference.

TECHNICAL FIELD

The present invention relates to a method of measuring fracture strength of single particles of a superabsorbent polymer in order to predict a generation amount of fine powder.

BACKGROUND OF THE INVENTION

A superabsorbent polymer (SAP) is a synthetic polymeric material capable of absorbing moisture of from 500 to 1000 times its own weight. Various manufacturers have called it by different names, such as SAM (Super Absorbency Material), AGM (Absorbent Gel Material), etc. Since such superabsorbent polymers started to be practically applied in sanitary products, they are now being widely used not only for hygiene products such as disposable diapers for children, etc., but also for water retaining soil products for gardening, water stop materials for civil engineering and construction, sheets for raising seedlings, fresh-keeping agents for food distribution fields, materials for poultices, and the like.

As a preparation process for such superabsorbent polymers, a process by reverse phase suspension polymerization or a process by solution polymerization has been known. For example, Japanese Patent Laid-open Publication Nos. S56-161408, S57-158209, and S57-198714 disclose the reverse phase suspension polymerization. In particular, a large amount of fine powder is generated during the preparation process of such superabsorbent polymers. Because all the fine powder cannot be discarded, the fine powder is mixed with a base resin of the superabsorbent polymer, and the mixture is reassembled and utilized as a product. However, it is better for a smaller amount of fine powder to be generated. If single particles of the superabsorbent polymer have lower strength, it is highly likely that the single particles become fine powder during the preparation process. Thus, many attempts have been made to increase strength of the particles, but there was no way to quantitatively and reproducibly evaluate whether or not the strength is increased after the attempts. Particularly, according to a known method of measuring a generation amount of fine powder from the superabsorbent polymer, a predetermined amount of the superabsorbent polymer is pulverized, and then the amount of fine powder is directly measured. Thus, there is a problem that it is difficult to quantitatively and reproducibly evaluate the fracture strength of single particles themselves of the superabsorbent polymer.

Accordingly, it is necessary to develop a method of effectively measuring strength of single particles of the superabsorbent polymer in order to predict the amount of fine powder which may be generated during the preparation process of the superabsorbent polymer.

DETAILS OF THE INVENTION

Objects of the Invention

The present invention provides a method of quantitatively measuring fracture strength of single particles of a superabsorbent polymer, which is closely related to generation of fine powder.

Means for Achieving the Object

According to an embodiment of the present invention, a method of measuring fracture strength of single particles of a superabsorbent polymer is provided, including the step of measuring a force at a time point when single particles having a particle size of 550 μm to 900 μm of the superabsorbent polymer are fractured by pressurizing the particles at a constant rate of 0.005 mm/s to 0.05 mm/s using a cylinder having a diameter of 8 mm, wherein the single particles of the superabsorbent polymer include a surface-crosslinked polymer prepared by surface-crosslinking a powdery base resin, which is polymerized from water-soluble ethylene-based unsaturated monomers having at least partially neutralized acidic groups, with a diol- or glycol-based compound having 2 to 8 carbon atoms.

The water-soluble ethylene-based unsaturated monomer may be one or more selected from the group consisting of an anionic monomer or salts thereof, a nonionic hydrophilic monomer, and an amino group-containing unsaturated monomer or a quaternary compound thereof, and in which the anionic monomer is acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth) acrylamide-2-methyl propane sulfonic acid; the nonionic hydrophilic monomer is (meth)acrylamide, N-substituted (meth)acrylate, 2-hydroxyethyl(meth)acrylate, 2-hydroxypropyl(meth)acrylate, methoxy polyethylene glycol (meth) acrylate, or polyethylene glycol (meth)acrylate; and the amino group-containing unsaturated monomer is (N,N)-dimethylaminoethyl(meth)acrylate or (N,N)-dimethylaminopropyl(meth)acrylate.

Further, in the present invention, the cylinder may be made of a material such as steel, ceramic, etc.

The particle size of the superabsorbent polymer may preferably be 600 μm to 850 μm, and the fracture strength of the single particles of the superabsorbent polymer may be measured by pressurizing the single particles at a constant rate of 0.01 mm/s.

Effect of the Invention

According to the present invention, an amount of fine powder which may be generated during a preparation process of a superabsorbent polymer may be effectively predicted by measuring a force at the time point when single particles having a uniform particle size of the superabsorbent polymer are fractured by pressurizing the particles at a constant rate.

BRIEF DESCRIPTION OF DRAWINGS

FIG. 1 illustrates a method of measuring fracture strength of single particles of a superabsorbent polymer according to an embodiment of the present invention;

FIG. 2 is a graph showing a generation amount of fine powder according to fracture strength of single particles of a superabsorbent polymer, which was measured according to an embodiment of the present invention;

FIG. 3 is a graph showing a force applied to single particles of a base resin of a superabsorbent polymer according to a distance while pressurizing the single particles at a constant rate according to an embodiment of the present invention;

FIG. 4 is a graph showing a force applied to single particles of a reassembly of a superabsorbent polymer according to a distance while pressurizing the single particles at a constant rate according to an embodiment of the present invention; and FIG. 5 is a graph showing fracture strengths of single particles (base resin) of a base resin of a superabsorbent polymer and single particles (fine powder reassembly) of a reassembly of the superabsorbent polymer, which were measured according to an embodiment of the present invention.

DETAILED DESCRIPTION OF THE EMBODIMENTS

In the present invention, the terms "first", "second", and the like are used to describe a variety of components, and these terms are merely employed to differentiate a certain component from other components.

Further, the terms used in this description are just for explaining exemplary embodiments and are not intended to restrict the present invention. A singular expression may include a plural expression unless it is differently expressed contextually. It must be understood that the term "include", "contain", "equip", or "have" in the present description specifies the presence of stated features, regions, integers, steps, operations, elements (or components), or combinations thereof, but do not preclude the presence or addition of one or more other features, regions, integers, steps, operations, elements (or components), or combinations thereof.

Hereinafter, a method of measuring fracture strength of a superabsorbent polymer according to a preferred embodiment of the present invention will be described in more detail.

The present inventors conducted studies on various attempts to increase strength of particles such that a generation amount of fine powder is minimized during a preparation process of a superabsorbent polymer, and they found that fracture strength of the single particles of the superabsorbent polymer may be quantitatively and reproducibly evaluated by using a force endured by single particles of the superabsorbent polymer when they are fractured while being pressurized in a constant rate, thereby completing the present invention.

According to an embodiment of the present invention, a method of quantitatively measuring fracture strength of single particles of a superabsorbent polymer, which is closely related to generation of fine powder, is provided. The method of measuring fracture strength of the superabsorbent polymer of the present invention includes the step of measuring a force at the time point when the single particles having a particle size of 550 micrometers (μm) to 900 micrometers (μm) of the superabsorbent polymer are fractured by pressurizing the particles at a constant rate of 0.005 millimeter (mm) per second to 0.05 millimeter (mm) per second, that is, 0.005 mm/s to 0.05 mm/s, using a cylinder having a diameter of 8 mm.

Particularly, in the present invention, the particle size of the superabsorbent polymer may preferably be 600 μm to 850 μm, and the single particles of the superabsorbent polymer may be pressurized at a constant rate of 0.01 mm/s.

In the present invention, the superabsorbent polymer includes a surface-crosslinked polymer prepared by surface-crosslinking a powdery base resin, which is polymerized from water-soluble ethylene-based unsaturated monomers having at least partially neutralized acidic groups, with a diol- or glycol-based compound having 2 to 8 carbon atoms.

In general, a large amount of fine powder is generated during a preparation process of superabsorbent polymers, and many efforts have been made to increase particle strength in order to reduce the generation amount of fine powder. The present invention relates to analyzing fracture strength of single particles for quantification of particle strength. Particularly, as shown in FIG. 1, the fracture strength test of the present invention is used to measure a force at the time point when single particles having a uniform particle size of the superabsorbent polymer are fractured by pressurizing the particles at a constant rate. A force which is applied when single particles having a uniform particle size of the superabsorbent polymer are pressurized at a constant rate after being loaded on an apparatus is measured. While the apparatus presses the superabsorbent polymer, a force endured by the superabsorbent polymer is gradually increased, and fracture occurs above a certain pressure. At this time, a maximum force endured by the particles is defined as fracture strength.

Further, as shown in FIG. 2, various samples were practically subjected to the test, and it was confirmed that when many different treatments were performed in order to increase strength, fracture strength was increased. It was confirmed that as fracture strength was increased, a generation amount of fine powder was generally reduced. Particularly, in the case of high fracture strength, generation of a large amount of fine powder was not observed.

Conditions for measuring fracture strength according to a preferred embodiment of the present invention are as follows.

Geometry Diameter: 8 mm
SAP particle size: 600-850 μm
Pressing rate: 0.01 mm/s

The cylinder used for measuring fracture strength of the superabsorbent polymer according to the present invention may be a cylinder having a diameter of 8 mm, which may be manufactured by using a variety of materials such as steel, ceramic, etc. Further, the cylinder may be a cylinder having higher strength than that of the superabsorbent polymer and having a shape in which the surface in contact with the superabsorbent polymer and the opposite surface are both even.

Meanwhile, the superabsorbent polymer (SAP), as used herein, is a synthetic polymeric material capable of absorbing moisture of from 500 to 1000 times its own weight. Various manufacturers have called it by different names, such as SAM (Super Absorbency Material), AGM (Absorbent Gel Material), etc. Since such superabsorbent polymers started to be practically applied in sanitary products, now they are now being widely used not only for hygiene products such as disposable diapers for children, etc., but also for water retaining soil products for gardening, water stop materials for civil engineering and construction, sheets for raising seedlings, fresh-keeping agents for food distribution fields, materials for poultice, and the like.

According to an embodiment of the present invention, the superabsorbent polymer may provide a synergistic effect by a combination of physical properties, which optimizes centrifugal retention capacity (CRC), absorbency under pressure (AUP), and gel bed permeability (GBP) at the same time. Here, centrifugal retention capacity (CRC), absorbency under pressure (AUP), and gel bed permeability (GBP) of the superabsorbent polymer may be the same as or higher than the below descriptions.

The superabsorbent polymer may have a particle shape, and may exhibit an anti-caking property which means that about 90% by weight or more of the superabsorbent polymer particles pass through a US Standard 12 mesh sieve having a pore size of 1700 µm after about 3 hours, preferably about 6 hours or more or about 9 hours or more, more preferably 15 hours or more, and much more preferably 24 hours or more at about 36±3° C. and relative humidity of about 77±3%.

The superabsorbent polymer of the present invention may provide a synergistic effect by a combination of physical properties, which optimizes centrifugal retention capacity (CRC) and absorbency under pressure (AUP) at the same time. Therefore, the superabsorbent polymer of the present invention may induce excellent physical properties and a comfortable feeling of wearing.

With regard to the superabsorbent polymer, centrifuge retention capacity (CRC) for a physiological saline solution may be 28 g/g or more, and absorbency under pressure (AUP) of 0.7 psi for a physiological saline solution may be 20 g/g or more.

With regard to the superabsorbent polymer, centrifuge retention capacity (CRC) for a physiological saline solution may be calculated according to the following Equation 1:

$$CRC(g/g) = \{[W_2(g) - W_1(g)]/W_0(g)\} - 1 \quad [\text{Equation 1}]$$

wherein $W_0$ (g) is the weight (g) of the absorbent polymer, $W_1$ (g) is the weight of the apparatus which is measured after draining water off at 250 G for 3 minutes with a centrifuge using no absorbent polymer, and $W_2$ (g) is the weight of the apparatus including the absorbent polymer which is measured after immersing the absorbent polymer in the physiological saline solution at 0.9% by weight at room temperature for 30 minutes and draining water off at 250 G for 3 minutes with a centrifuge.

The superabsorbent polymer may have centrifuge retention capacity (CRC) for a physiological saline solution of 28 g/g or more.

Further, with regard to the superabsorbent polymer of the present invention, the absorbency under pressure (AUL) of 0.7 psi for the physiological saline solution may be calculated by the following Equation 2:

$$AUP(g/g) = [W_4(g) - W_3(g)]/W_0(g) \quad [\text{Equation 2}]$$

wherein $W_0$ (g) is the weight (g) of the absorbent polymer, $W_3$ (g) is the total weight of the absorbent polymer and the apparatus capable of providing a load for the absorbent polymer, and $W_4$ (g) is the total weight of the water-absorbed absorbent polymer and the apparatus capable of providing a load for the absorbent polymer, which are measured after supplying water for the absorbent polymer under a load (0.7 psi) for 1 hour.

With regard to the superabsorbent polymer, the absorbency under pressure (AUL) of 0.7 psi for the physiological saline may be 20 g/g or more.

In the present invention, $W_0$ (g) described in each of Equations 1 and 2 corresponds to the weight (g) of the superabsorbent polymer, which was applied to each value of the physical properties, and may be the same as or different from each other.

In the present invention, the superabsorbent polymer may have gel bed permeability (GBP) for physiological saline of 10 Darcy or more, or permeability of 40 seconds or less.

The superabsorbent polymer may include the surface crosslinked polymer prepared by surface-crosslinking a powdery base resin, which is polymerized from water-soluble ethylene-based unsaturated monomers having at least partially neutralized acidic groups, with a diol- or glycol-based compound having 2 to 8 carbon atoms.

Further, the crosslinking density of the surface crosslinked polymer may be a factor that affects the value of the absorbency under pressure (AUP), and therefore, the base resin is preferably surface-crosslinked according to the method of the present invention.

The water-soluble ethylene-based unsaturated monomer may be one or more selected from the group consisting of an anionic monomer or salts thereof, a nonionic hydrophilic monomer, and an amino group-containing unsaturated monomer or a quaternary compound thereof, and in which the anionic monomer is acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth) acrylamide-2-methyl propane sulfonic acid; the nonionic hydrophilic monomer is (meth)acrylamide, N-substituted (meth)acrylate, 2-hydroxyethyl(meth)acrylate, 2-hydroxypropyl(meth)acrylate, methoxy polyethylene glycol (meth) acrylate, or polyethylene glycol (meth)acrylate; and the amino group-containing unsaturated monomer is (N,N)-dimethylaminoethyl(meth)acrylate or (N,N)-dimethylaminopropyl(meth)acrylate.

Meanwhile, fracture strength of single particles of the base resin of the superabsorbent polymer, which was measured according to the present invention, may be 1.5 kgf or more, 1.5 kgf to 20 kgf, or preferably 2 kgf or more. However, single particles of the fine powder reassembly of the superabsorbent polymer may have fracture strength of 0.5 kgf or less.

Hereinafter, the preferred examples of the present invention will be described in detail. However, these examples are for illustrative purposes only, and the scope of the present invention is not intended to be limited by these examples.

EXAMPLES

Preparation Example 1: Preparation of Base Resin of Superabsorbent Polymer

First, a superabsorbent polymer was prepared by the following method. 100 g of acrylic acid, 0.25 g-0.5 g of polyethylene glycol diacrylate (Mw=523) as a crosslinking agent, 83.3 g of 50% caustic soda (NaOH), and 89.8 g of water were mixed to prepare a monomer aqueous solution having a monomer concentration of 45% by weight.

Subsequently, 810 g of the monomer aqueous solution was mixed with 30.54 g of a 0.18% ascorbic acid solution and 33 g of a 1% sodium persulfate solution, and the mixture was fed through a feed section of a continuous polymerization reactor with a kneader, together with 30.45 g of a 0.15% hydrogen peroxide solution, so as to perform polymerization. At this time, temperature of the reactor was maintained at 80° C., the maximum polymerization temperature was 110° C., and the polymerization time was 1 min and 15 s. Thereafter, kneading was continuously performed, and polymerization and kneading were performed for 20 min. Polymers having a size of 0.2 cm or less were thus distributed. At this time, a water content of a water-containing gel polymer finally formed was 51% by weight.

Subsequently, the water-containing gel polymer was dried with a hot air dryer at 180° C. for 30 min, and the dried water-containing gel polymer was pulverized with a pin mill. Next, the polymer was classified into a polymer having a particle size (average particle size) of less than 150 μm and a polymer having a particle size of 150 μm to 850 μm by using a sieve to obtain a base polymer having CRC of 34 g/g.

Preparation Example 2: Preparation of Reassembly of Superabsorbent Polymer

Reassembly of the superabsorbent polymer was prepared by a reassembling process of mixing the base resin of the superabsorbent polymer prepared according to Preparation Example 1 with fine powder generated during a previous preparation process of other polymer resin.

Examples 1 and 2

Fracture strengths of single particles of the base resin of the superabsorbent polymer of Preparation Example 1 and single particles of the reassembly of the superabsorbent polymer of Preparation Example 2 were measured by the following method.

As shown in FIG. 1, XT2plus of TA Instruments which was equipped with a cylinder having a diameter of 8 mm was used to press single particles having a particle size of 600 μm to 850 μm of the superabsorbent polymer at a constant rate of 0.01 mm/s, and the maximum force endured by the single particles of the superabsorbent polymer was measured as fracture strength. In this way, fracture strength (kgf, kg force) was measured with respect to each 20 or more of the single particles of the base resin and the fine powder reassembly of the superabsorbent polymer.

Results of measuring fracture strengths of single particles (base resin) of the base resin of the superabsorbent polymer of Preparation Example 1 and single particles (fine powder reassembly) of the reassembly of the superabsorbent polymer of Preparation Example 2 are shown in FIG. 5 and in the following Table 1.

TABLE 1

| Sample | | Fracture strength (kgf) |
|---|---|---|
| Example 1 | Base Resin | 2.09 ± 0.78 |
| Example 2 | Fine Powder Reassembly | 0.24 ± 0.15 |

As shown in Table 1, according to the present invention, fracture strengths of the respective single particles of the base resin and the fine powder reassembly of the superabsorbent polymer could be accurately measured. In particular, it was directly confirmed that fracture strength of the fine powder reassembly was remarkably lower than that of the base resin of the superabsorbent polymer.

The invention claimed is:

1. A method of measuring a fracture strength of single particles of a superabsorbent polymer, comprising the step of measuring a force at a time point when the single particles having a particle size of 550 μm to 900 μm of the superabsorbent polymer are fractured by pressurizing the particles at a constant rate of 0.005 mm/s to 0.05 mm/s using a cylinder having a diameter of 8 mm, wherein the single particles of the superabsorbent polymer include a surface crosslinked polymer prepared by surface-crosslinking a powdery base resin, which is polymerized from water-soluble ethylene-based unsaturated monomers having at least partially neutralized acidic groups, with a diol- or glycol-based compound having 2 to 8 carbon atoms,
    wherein a surface of the cylinder is in contact with the superabsorbent polymer.

2. The method of claim 1, wherein the water-soluble ethylene-based unsaturated monomer is one or more selected from the group consisting of an anionic monomer or salts thereof, a nonionic hydrophilic monomer, and an amino group-containing unsaturated monomer or a quaternary compound thereof, and in which the anionic monomer is acrylic acid, methacrylic acid, maleic anhydride, fumaric acid, crotonic acid, itaconic acid, 2-acryloylethane sulfonic acid, 2-methacryloylethane sulfonic acid, 2-(meth)acryloyl-propane sulfonic acid, or 2-(meth)acrylamide-2-methyl propane sulfonic acid; the nonionic hydrophilic monomer is (meth)acrylamide, N-substituted (meth)acrylate, 2-hydroxyethyl(meth)acrylate, 2-hydroxypropyl(meth)acrylate, methoxy polyethylene glycol (meth)acrylate, or polyethylene glycol (meth)acrylate; and the amino group-containing unsaturated monomer is (N,N)-dimethylaminoethyl(meth)acrylate or (N,N)-dimethylaminopropyl(meth)acrylate.

3. The method of claim 1, wherein the cylinder is made of steel or ceramic.

4. The method of claim 1, wherein a particle size of the superabsorbent polymer is 600 μm to 850 μm.

5. The method of claim 1, wherein a constant pressurization rate of the cylinder is 0.01 mm/s.

6. The method of claim 1, wherein a fracture strength of single particles of the superabsorbent polymer is 2 kgf or more.

* * * * *